Patented Apr. 28, 1925.

1,535,740

UNITED STATES PATENT OFFICE.

WALTER O. SNELLING, OF ALLENTOWN, PENNSYLVANIA.

SULPHURIZED CHEMICAL PRODUCT.

No Drawing. Application filed September 5, 1919. Serial No. 321,943.

*To all whom it may concern:*

Be it known that I, WALTER O. SNELLING, a citizen of the United States, residing at Allentown, in the county of Lehigh and State of Pennsylvania, have invented certain Improvements in Sulphurized Chemical Products, of which the following is a specification.

My invention relates to the preparation of chemical products, and has for its object the alteration of the molecular constitution of organic bodies, for the purpose of imparting to the new products formed certain physical and chemical characteristics of desirable nature.

In my copending application for Letters Patent S. N. 29,765 filed May 22, '15, I have described methods of preparing bodies of unique and valuable properties by a series of steps which comprise the vulcanization of a fatty oil and the depolymerization of the vulcanized product so obtained, by means of certain reagents and certain assisting or accelerating materials, and the checking of further chemical changes after the desired degree of depolymerization has been achieved.

I have discovered that the ability to undergo the series of transformations described in my earlier application referred to is not confined to vulcanizable oils, but that instead a large number of bodies of widely different chemical and physical characteristics when treated by the methods which I have outlined are capable of yielding new compounds which have certain properties in common, and which possess physical and chemical characteristics which give them commercial value. These bodies will be referred to in this application as "unvulcanizable organic bodies", and by this term is meant organic bodies which, in contradistinction to vulcanizable oils, do not react with sulfur chloride when mixed therewith, to form rubber-like solid or semi-solid factis.

My present invention rests upon the discovery made by me that when certain organic bodies of high molecular weight are kept in contact for a considerable period of time with an excess of sulfur chloride, either alone or together with certain accelerating agents, a series of deep-seated chemical changes go on, among which the most significant seems to be the progressive dehydrogenation of the organic body and the taking up of sulfur into the molecule of the dehydrogenated material. As a result of these chemical changes the new bodies produced possess certain characteristics very different from those of the parent body, the most evident of these changes resulting from an apparent great increase in the residual molecular attraction or chemical affinity of the new bodies. Usually this is shown by the tendency of the new bodies to form highly cohesive and caoutchouc-like products by molecular rearrangement, or to form emulsion colloids and highly hydrated bodies on contact with water.

In my copending applications S. N. 29,-765 filed May 22, '15, now U. S. 1,315,246 S. N. 316,022 filed Aug. 8, '19, now U. S. 1,-430,034 S. N. 316,023, filed Aug. 8, '19, now U. S. 1,376,172 S. N. 316,024, filed Aug. 8, '19, and now U. S. 1,376,173 and S. N. 318,-967 filed Aug. 21, '19, now U. S. 1,376,174 I have described the application of my invention to vulcanizable materials, and accordingly I do not claim in my present application the treatment by my new process of any of those materials which are commonly recognized as being of vulcanizable nature. I have found, however, that many materials which have not previously been recognized as being vulcanizable are capable of reacting with sulfur chloride and an accelerator such as an hydroxylated body, and the purposes of my present application is to outline the process by which organic bodies of high molecular weight may be treated with sulfur chloride and an accelerator for the purpose of bringing about chemical changes roughly analogous to those which I have previously described in the case of vulcanizable products.

Mineral oils such as the lubricating oils made from petroleum are not usually considered to be vulcanizable, although of course it has long been known that these hydrocarbons, in common with a very large number of organic bodies, will react somewhat with sulfur under favorable conditions, and particularly at high temperatures. On treating a lubricating oil made from petroleum with an excess of sulfur chloride, and particularly in the presence of an accelerator such as methyl alcohol for example, and allowing the reaction to go on for a number of days at ordinary temperatures, or for a shorter time at high temperatures, I find that bodies having some of the properties of depolymerized sulphurized fatty oils may be obtained, and that the products so formed possess the ability to hydrate when brought in contact with water, and that emulsion colloids of technical importance may be so produced.

By treating oleic acid in a manner exactly similar to the procedure outlined for a mineral oil there is obtained an emulsion colloid which is physically quite similar to the product made from a mineral oil, and which like the mineral oil product may be used in the preparation of emulsion colloids, and as a substitute for lanolin for pharmaceutical purposes and for other uses.

If instead of treating organic products of high molecular weight such as organic acids and esters, and bodies containing a hydrocarbon chain such as mineral oils, I employ oxygen containing organic bodies of high molecular weight, such as starch for example, I similarly obtain dehydrogenation products having increased tendency toward hydration on contact with water. The number of bodies which are capable of undergoing reaction when confined for some time with sulfur chloride in the presence of an accelerating agent with the production of dehydrogenated products, is very great, and by suitable variation of the amount of sulfur chloride used, the nature and amount of the accelerator employed, the time during which the reaction is permitted to go on, and the temperature maintained during such period, the nature of the resulting products may be materially modified.

In the preparation of bodies of high plasticity I prefer to use only a moderate excess of sulfur chloride, and to employ an hydroxylated body of the nature of hydroxy-stearic acid as an accelerator, using a period of reaction of two or three days at normal temperature. In the preparation of emulsion colloids to be used as substitutes for lanolin for example, I find it more desirable to use a considerable excess of sulfur chloride, and to use as an accelerator an hydroxylated body such as a lower alcohol, and particularly such a body as methyl alcohol and ethyl alcohol.

The preferred manner of bringing about reaction between the organic body of high molecular weight to be treated and the sulfur chloride depolymerizing agent and the accelerating reagent will of course vary with the nature of the material to be treated and the characteristics desired in the finished product, but in general I find it best to first mix the accelerating agent or agents with the material to be treated, and to leave these materials together in a closed vessel for a number of hours at room temperature. I then add sulfur chloride in considerable excess, and after stirring the materials together I allow the mixture to stand in a closed container until the reaction has progressed sufficiently. A vent should preferably be provided in the reaction vessel, since during the whole period of dehydrogenation gases will be given off, and unless released may produce sufficient pressure to rupture the vessel. When a sufficient degree of dehydrogenation has been brought about I interrupt the reaction and prevent further dehydrogenation, preferably by stirring the mixture into water, or otherwise removing and decomposing the excess of sulfur chloride and accelerating agent still present in the mixture.

A very large number of organic bodies of high molecular weight when treated according to my present invention yield plastic and elastic products which possess many of the properties of rubber, and which may be used not only as compounding ingredients in rubber manufacture, but may even be used as substitutes for rubber in compositions in which no rubber is present. Thus from ordinary hydrocarbons such as crude petroleum, petroleum sludge, cracked hydrocarbons, residues from the pressure distillation of petroleum, tar, rosin oil, and other like bodies, I obtain by treatment according to my present invention a series of rubber-like gutta percha-like, and chicle-like bodies which possess valuable properties as rubber substitutes and rubber compounding agents. Although the details of my preferred treatment varies somewhat with each different raw material used, in order to obtain the desired characteristics in my finished product, yet the general nature of my treatment is essentially the same, and comprises the depolymerization of the material being treated, with the production of unsatisfied or unsaturated chemical attractions in the molecular aggregates, followed by the partial or complete saturation of these unsaturated residual valences. In producing the desired polymerization of the raw material under treatment I prefer to cause the material to undergo reaction in a closed container in the presence of an excess of sulfur chloride and an accelerating agent, under conditions favorable to the progressive dehydrogenation of the material under treatment, until a suitable degree of depolymerization has been brought about.

As an example of my present invention I will describe the procedure which I follow in preparing a rubber-like body of high plasticity and elasticity from a hydrocarbon such as ordinary lubricating oil of medium viscosity. To 100 g. of the lubricating oil I add 20 c. c. of methyl alcohol, and 50 c. c. of carbon bisulfide, and I stir these materials together, and then allow the mixture to stand in a closed container for two hours at room temperature. I then add 100 c. c. of sulfur chloride with stirring, and then allow the materials to stand in the closed container for a period of five days. During this period a reaction of unknown nature goes on, and the molecular constitution of the lubricating oil is fundamentally changed. I then add about 500 c. c. of water to the oily product, and stir to bring the water and the oil into intimate contact, this stirring being preferably brought about by means of a beater. The depolymerized hydrocarbon takes up water and hydrates, and should then be left in contact with the water for a further period of six days. Further hydration, accompanied by polymerization, goes on during this period of standing, the fluid oily material gradually being transformed into a tough elastic body which is highly cohesive and plastic. This body is now separated from the excess of water which is present, and is run between rolls to separate it from any water and free oil which may be present. The material will now be found to be in the form of a tough rubber-like mass possessing a very high degree of elasticity.

By proceeding in an exactly similar way to that just described, but using ordinary rosin oil instead of a lubricating oil as the raw material, a black tar-like liquid product is obtained as the result of the depolymerizing and the repolymerizing steps. On spreading this liquid in a thin film for a number of days exposed to the atmosphere it undergoes a further repolymerization, with the production of a highly plastic body of the nature of chicle.

It is evident that by varying the nature and the amount of the organic body used as the raw material, the nature and amount of the accelerating agent, the amount of sulfur chloride used, the duration of the depolymerizing period, the temperature during such period, the amount of water or other equivalent agent used in the hydrating or repolymerizing step, the time during which repolymerization is permitted to go on, the temperature during repolymerization, and other like variables, it is possible to modify through an extremely great range the nature of the products obtained in accordance with my present invention. The essential feature of my invention is the depolymerization of an organic body of high molecular weight by means of a reagent such as an excess of sulfur chloride, and the subsequent repolymerization or hydration of the depolymerized product so prepared.

From hydrocarbons such as petroleum and like bodies I obtain as the result of my depolymerizing and repolymerizing steps bodies which are desirable as rubber compounding agents and as rubber substitutes. From organic bodies such as oleic acid, starch, rosin oil and like materials I obtain bodies which may be used as emulsifying agents, substitutes for lanolin, and other like purposes. By oxidizing the product obtained through the described steps of depolymerization and repolymerization, or depolymerization and hydration, I obtain chicle-like and resin-like bodies which may be used in the preparation of varnishes and paints.

I find that the presence of an accelerating agent such as an hydroxylated body of the nature of an alcohol, and a diluent such as carbon bisulfide, greatly facilitate the depolymerizing step, and that the repolymerization or hydration proceeds much more quickly when a suitable amount of such agents have been used in the depolymerizing step. By using a considerable excess of methyl alcohol and carbon bisulfide in the depolymerization of a petroleum product by means of an excess of sulfur chloride, I may obtain on stirring the mass with water a product which hydrates so rapidly that it forms an emulsion colloid containing several hundred per cent of water, and which holds a considerable part of this water most tenaciously under dehydrating or drying conditions.

A relatively high temperature, and the prolonged action of the sulfur chloride and the accelerating agent, is favorable to the withdrawal from the compound under treatment of a very large amount of its hydrogen, with a correspondingly great degree of unsaturation. By continuing the dehydrogenation step for a long period, or accelerating this dehydrogenation by warming, I can produce so great a degree of unsaturation in my resulting compounds that they tend to repolymerize, hydrate or oxidize, in the succeeding treatment, with very great rapidity. I find that in the preparation of sulfur-containing oily products of high unsaturation and suitable for use as drying oils and as a base for varnish, it is desirable to continue the dehydrogenation action of sulfur chloride and an accelerator such as methyl alcohol until the further evolution of hydrogen from the mass almost stops. This will require a period of several weeks at normal temperatures, but this time may be greatly lessened by using a considerable excess of sulfur chloride, a considerable excess of the accelerator, an elevated temperature, or the simultaneous action of two or more of these factors.

Although any of the methods of procedure outlined in my pending application S. N. 29,765 may be employed in the treatment of suitable raw materials, I find that in the practice of my present invention I obtain the most satisfactory results by using an alcohol of low molecular weight as my accelerating agent, carbon bisulfide as my diluent, and sulfur chloride as my depolymerizing agent. I prefer to first mix together the body to be treated and the accelerating agent, together with the diluent, if one is to be used. I prefer to let these materials stand together for a number of hours to undergo thorough mixing. I then add an excess of my depolymerizing agent, and I preferably allow the depolymerizing action to go on for a prolonged period, which may be several days, or which may be lengthened to a month or more when very deep-seated depolymerization is desired. I prefer to terminate the depolymerizing action by contacting the depolymerized product with water, concentrated salt solution, dilute alkali, or other agents capable of removing or destroying any excess of the depolymerizing agent which is present. I then prefer to bring about a desired degree of repolymerization, this being produced by contact with water, air, or other equivalent agent. Where it is desired to bring about the addition or combination of some other material than water, the highly unsaturated depolymerization product is brought in contact with such body, either immediately at the close of the depolymerization step, or after partial saturation or hydration by contacting the depolymerized product with water or air.

From the foregoing statement it will be evident that the range of modifications which may be effected in my process is very great. My invention should therefore not be considered as being limited to the specific illustrations given, but should be understood to cover all equivalents of the materials and methods that have been specifically mentioned, and no limitations are to be imposed upon my invention except such as are indicated in the appended claims.

I claim as my invention:

1. The process which comprises dehydrogenating an unvulcanizable organic body by means of sulfur chloride and an hydroxylated body.

2. The process which comprises dehydrogenating an unvulcanizable organic body by means of sulfur chloride and an alcohol.

3. The process which comprises dehydrogenating an unvulcanizable organic body of high molecular weight by contacting it with sulfur chloride in the presence of an accelerating agent and a diluent, and subsequently bringing the product of reaction into contact with water.

4. The process which comprises contacting a non-vulcanizing oil with sulfur chloride until dehydrogenation occurs.

5. The process which comprises contacting an unvulcanizable organic hydrogen containing body of high molecular weight with sulfur chloride until dehydrogenation begins, and subsequently arresting the dehydrogenating action by removing the excess of sulfur chloride present.

6. The process which comprises producing unsaturation in an unvulcanizable aliphatic organic body of high molecular weight by reacting on such body with sulfur chloride until hydrogen is withdrawn.

7. The process which comprises producing unsaturation in an unvulcanizable organic body of high molecular weight by reacting on such body with sulfur chloride until hydrogen is withdrawn, and subsequently increasing the saturation of the resulting body by contacting with water.

8. The process which comprises hydrating an organic body by withdrawing hydrogen by means of sulfur chloride and subsequently contacting the resulting body with water.

9. The process which comprises withdrawing hydrogen from an aliphatic organic body of high molecular weight by means of sulfur chloride, and subsequently increasing the saturation of the body by contacting it with a substance capable of directly combining with the product so formed.

10. The process which comprises contacting a petroleum hydrocarbon with sulfur chloride and an accelerating agent to produce an unsaturated body, and contacting such unsaturated body with water to produce an elastic and plastic product.

11. The process which comprises contacting a non-vulcanizing oil with sulfur chloride until hydrogen is withdrawn, and contacting the product so formed with water to produce an elastic and plastic product.

12. The process which comprises contacting a non-saponifiable oil with sulfur chloride, and contacting the resulting product with water to produce a plastic product.

13. The process which comprises contacting an unsaturated hydrocarbon with sulfur chloride until increased unsaturation is brought about, and subsequently increasing the saturation of the resulting product by contact with an oxygen-containing body.

14. The process which comprises contacting an unvulcanizable organic body of high molecular weight with sulfur chloride until hydrogen is eliminated, and subsequently increasing the hydrogen content of the body by contacting it with water.

15. The process which comprises confining a hydrocarbon oil with sulfur chloride and methyl alcohol until dehydrogenation has been brought about, and subsequently bringing the dehydrogenation product into contact with water to form a rubber-like body.

16. The process which comprises increasing the elasticity of an unvulcanizable organic body of high molecular weight by confining it with sulfur chloride and an alcohol and subsequently contacting the product so formed with water.

17. The process of decreasing the fluidity of an unvulcanizable oil by reacting on such oil with an excess of sulfur chloride to form a liquid product, and subsequently bringing the liquid product so obtained in contact with water.

18. The product obtained by withdrawing hydrogen from an aliphatic organic body of high molecular weight by means of sulfur chloride.

19. The product obtained by withdrawing hydrogen from an organic body of high molecular weight by means of sulfur chloride, and subsequent repolymerization.

20. The product obtained by withdrawing hydrogen from a mineral hydrocarbon by means of sulfur chloride.

21. A plastic product obtained from a mineral hydrocarbon by withdrawing hydrogen by means of sulfur chloride and polymerizing the resulting product.

22. A plastic and elastic product obtained from an unsaponifiable oil by withdrawing hydrogen by means of sulfur chloride, and polymerizing by contact with an oxygen containing body.

23. A hydrated body obtained from an unsaponifiable oil by withdrawing hydrogen by means of sulfur chloride and hydrating by contacting with water.

In testimony whereof, I have hereunto subscribed my name this 4th day of September, 1919.

WALTER O. SNELLING.